United States Patent [19]

Takahashi et al.

[11] 4,265,173

[45] May 5, 1981

[54] NUMBERING MACHINE WITH CHECK DIGIT FUNCTION

[75] Inventors: Mutsumi Takahashi, Kawasaki; Toshio Uwabe, Tokyo; Toshio Nagase, Yokohama; Shosuke Sato, Tokyo, all of Japan

[73] Assignees: Tokyo Keiki Company Ltd.; Totec Co., Ltd., both of Tokyo, Japan

[21] Appl. No.: 955,235

[22] Filed: Oct. 27, 1978

[30] Foreign Application Priority Data

Oct. 31, 1977 [JP] Japan ................................ 52/130405
Nov. 1, 1977 [JP] Japan ................................ 52/131003
Feb. 17, 1978 [JP] Japan ................................ 53/17432

[51] Int. Cl.[3] .......................... G06F 11/10; B41J 3/40

[52] U.S. Cl. ...................................... 101/79; 101/102; 371/54

[58] Field of Search ....................... 101/72, 76, 77, 79, 101/80-84, 93.11; 235/92 EC, 61.7 R; 340/146.1 AG, 146.1 AJ; 364/738

[56] References Cited

U.S. PATENT DOCUMENTS

| | | | |
|---|---|---|---|
| 3,254,596 | 6/1966 | Shovp et al. | 101/102 |
| 3,571,581 | 3/1971 | Kaus | 340/146.1 AJ |
| 3,650,205 | 3/1972 | Hybrow et al. | 340/146.1 AJ |
| 3,778,766 | 12/1973 | Rapp | 340/146.1 AJ |
| 3,815,495 | 6/1974 | Straudbein | 101/79 X |
| 4,085,670 | 4/1978 | Poole | 101/76 |

FOREIGN PATENT DOCUMENTS

| | | | |
|---|---|---|---|
| 693554 | 7/1953 | United Kingdom | 101/72 |
| 693730 | 7/1953 | United Kingdom | 101/72 |
| 1225121 | 3/1971 | United Kingdom | 101/72 |
| 1242843 | 8/1971 | United Kingdom | 101/72 |

OTHER PUBLICATIONS

Lavin et al. IBM Tech. Discl. Bulletin, vol. 10, No. 12, May, 1968, pp. 1872-1873.

*Primary Examiner*—Edward M. Coven
*Attorney, Agent, or Firm*—Haseltine and Lake

[57] ABSTRACT

There is disclosed a numbering machine designed so that code numbers as well as check digits each consisting of a single-place digit are printed by means of a mechanical mechanism. The check digits are printed by a check digit type wheel having an arrangement of circulating digits which are calculated in correspondance with code numbers in accordance with a modulus 10 or 11 check with predetermined weights. When there is a carry from one code number digit place to the next higher digit place, it is necessary to print the digit skipped a predetermined number of the digits in the circulating digit arrangement, and as a result a drive control mechanism is provided so that when a change from one code number to the next higher code number necessitates a skipping operation, the change is detected and the check digit type wheel is rotated idly through a predetermined angle.

9 Claims, 13 Drawing Figures

NUMBERING MACHINE WITH CHECK DIGIT FUNCTION

BACKGROUND OF THE INVENTION

The present invention generally relates to numbering machines, and more particularly the invention relates to a numbering machine including a check digit printing mechanism whereby when a code number is printed, an associated check digit is printed simultaneously.

Generally, the check digits used for coding error detecting purposes each consists of a single-place digit calculated from the figure of the corresponding code number and it is for example appended to the right of the least significant digit of the code number. In other words, a check digit is appended to an important key number such as an account number or customer code number and the check digits are used for the purpose of detecting coding errors caused during the computer processing. Included among the known methods of forming check digits are modulus 10 checks typical of which is the Luhn's check as well as modulus 11 checks. With a 9's check or a 7's check, a particular sequence of digits is simply circulated in response to changes of code numbers, and since it is only necessary to arrange so that a check digit type wheel for printing check digits is intermittently rotated in the same manner as the least significant digit numbering type wheel of a print unit, the mechanism of a numbering machine is simple and this type of machine has already been put in practical use.

On the other hand, with each of the modulus 10 check and the modulus 11 check, while the check digits are calculated in correspondence with the code numbers by using a predetermined weighting method and consequently a predetermined sequence of digits is circulated to print the check digits, there occur singular points at which a discontinuous change is caused in the circulating sequence of digits when going from one code number to the next code number, thus making it difficult to realize a numbering machine as compared with that according to the 9's check. As a result, no practical numbering machine has been put in use which is capable of continuously printing the desired check digits according to the modulus 10 check or the modulus 11 check, and in the actual business data processing a technique has been used in which each code number to be printed is appended with a check digit calculated by a calculation method based on a predetermined modulus and weights. As a result, much time and labor have been required for the calculation and printing of check digits, and particularly in the case of a rotary press or the like it has been nearly impossible to print each code number and its associated check digit simultaneously.

SUMMARY OF THE INVENTION

It is an object of the present invention to provide a numbering machine wherein a corresponding one of the check digits calculated according to the modulus 10 or 11 check or predetermined weights is printed when changing from one code number to the next code number.

It is another object of the invention to provide a numbering machine capable of printing each code number together with its associated check digit by means of a mechanical mechanism.

It is still another object of the invention to provide a plurality of different check digit type wheels each adapted for use with the numbering machine of this invention and including predetermined circulating sequence of digits formed according to one of all the possible weights in the modulus 10 check.

It is still another object of the invention to provide a plurality of different check digit type wheels each adapted for use with the numbering machine of the invention and including predetermined circulating sequence of digits according to one of all the possible weights in the modulus 11 check.

It is still another object of the invention to provide a mechanism which mechanically detects a singular point change of code number causing a discontinuous change in the circulating sequence of check digits.

It is still another object of the invention to provide a mechanism responsive to the mechanical detection of a singular point change of code number to rotate the check digit type wheel idly through an angle corresponding to a predetermined number of skipping check digits.

It is still another object of the invention to provide a mechanism which mechanically stores the number of the skipping check digits in response to the occurrence of a discontinuous change in the circulating sequence of check digits at each singular point.

It is still another object of the invention to provide a mechanism which is responsive to the detection of each singular point to release the self-locking of the check digit type wheel and cause it to rotate idly a predetermined number of pitches.

It is still another object of the invention to provide a mechanism whereby when the circulating sequence of check digits is changed continuously in response to changes of code number, the check digit type wheel is intermittently rotated at a constant pitch synchronized with the rotational angle or its twofold of the least significant digit numbering type wheel of the print unit.

DESCRIPTION OF THE PREFERRED EMBODIMENTS

Figure 1:
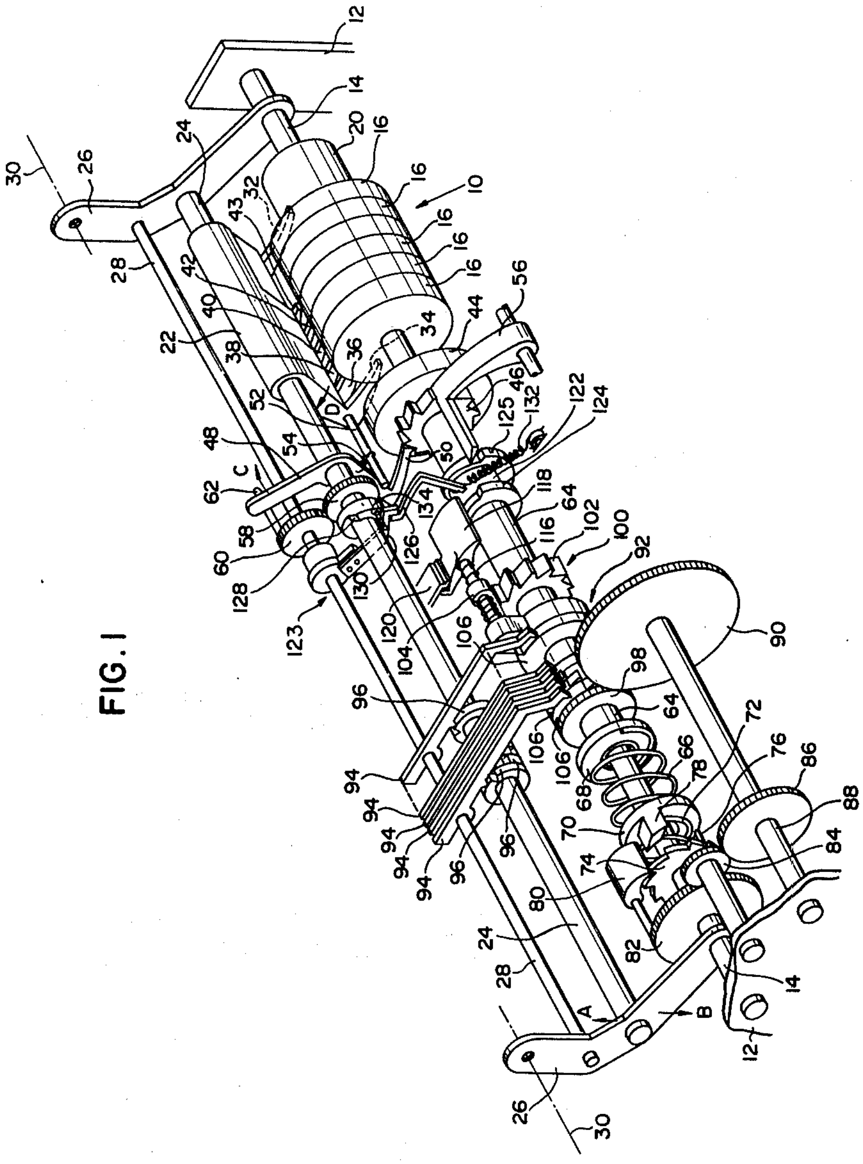
FIG. 1 is a schematic diagram of a numbering machine according to the invention showing the construction for intermittently rotating a check digit type wheel at the same pitch with the least significant digit numbering type wheel of a print unit.

The check digits which will be printed by the numbering machine of this invention in correspondence with the code numbers will now be described first.

The check digits used with the machine of this invention are digits calculated according to the modulus 10 or the modulus 11. In the calculation of these check digits, the digits of each code number are each multiplied by a predetermined number. These multipliers are called weights. Thus, by selecting a modulus and weights, it is possible to calculate check digits. Modulus 10:

A typical form of the modulus 10 check is called the Luhn's check in which a sequence of weights 1 and 2 is repeated. There are many other check systems classified according to the type of weighting, such as, weights 1, 3, 1, 3, 1, 3 check, weights 7, 6, 5, 4, 3, 2 check, weights 8, 7, 6, 5, 4, 3, 2 check, weights 9, 8, 7, 4, 3, 2 check and weights 1, 3, 7, 1, 3, 7 check. According to the modulus 10 check, if a code number is $C_n \ldots C_2\, C_1$ and weights are $W_n \ldots W_2\, W_1$, then the corresponding check digit can be obtained in the following way $$\begin{array}{ll} \text{Code number} \longrightarrow & C_n \ldots C_2\, C_1 \\ & \times \quad\ \times\ \times \\ \text{Weights} \longrightarrow & W_n \ldots W_2\, W_1 \\ \hline & W_nC_n + \ldots + W_2C_2 + W_1C_1 = \text{sum} \end{array}$$

$$\text{Sum} \div 10 = \text{quotient} \ldots \text{remainder}$$

$$10 - \text{remainder} = \text{check digit}$$

In the case of the Luhn's check, however, if the resulting $W_nC_n + \ldots + W_2C_2 + W_1C_1$ are two figures, the addition is effected separately for the respective digit positions. Modulus 11:

The modulus 11 check provides check digits having a very high error detecting rate, and the check digits are calculated by determining particular weights in the same manner as the modulus 10 check. In other words, according to the modulus 11 check, if a code number is $C_n \ldots C_2C_1$ and weights are $W_n \ldots W_2W_1$, then a check digit can be obtained in the following way $$\begin{array}{ll} \text{Code number} \longrightarrow & C_n \ldots C_2\, C_1 \\ & \times \quad\ \times\ \times \\ \text{Weights} \longrightarrow & W_n \ldots W_2\, W_1 \\ \hline & W_nC_n + \ldots + W_2C_2 + W_1C_1 = \text{sum} \end{array}$$

$$\text{Sum} \div 11 = \text{quotient} \ldots \text{remainder}$$

$$11 - \text{remainder} = \text{check digit}$$

In this case, when the remainder is 1, the resulting check digit is a two figure number 10. However, since each check digit is a single-place digit, this check digit cannot be distinguished from a check digit 0 for a divisible sum. Thus, in general there are many instances where the use of any code number requiring a two figure check digit is avoided or alternatively a suitable check number, such as, 0 or 1 is used.

Circulating sequence of check digits

The inventors, etc., have discovered that the check digits calculated according to the modulus 10 and 11 checks, respectively, take the form of a particular circulating sequence of digits which repeats in a particular order in dependence on the weights used. It has also been discovered that except for the Luhn's check, the circulating sequence of digits circulates discontinuously when there is a carry from one code number digits place to the next place. For example, in the case of a modulus 10, weights 1, 3, 7, 1, 3, 7 check, the check digits will circulate in the following manner:

$$\begin{array}{ccc} 0 & \rightarrow 3 \rightarrow 6 \rightarrow 9 \rightarrow & 2 \\ \uparrow & & \downarrow \\ 7 & \leftarrow 4 \leftarrow 1 \leftarrow 8 \leftarrow & 5 \end{array}$$

and when changing from one code number . . .9 to . . . 10, i.e., when there is a carry from the units digit place to the tens digit place or at a singular point, the digit remains the same or 7, and when changing from . . .099 to . . . 100 or when there is a carry from the tens digit place to the hundreds digit place, the check digit changes from 0 to 9 by a 3-skip change. These changes are summarized by the following Table 1.

TABLE 1

| Change of code number (singular point) | Change of check digit | No. of skips |
|---|---|---|
| ...9→.....10 | 7→7 | 0 |
| ...099→.....100 | 0→9 | 3 |
| ...0999→.....1000 | 1→3 | 4 |
| ...09999→.....10000 | 8→7 | 3 |

Next, consider the Luhn's check with weights 1, 2, 1, 2, 1, 2. In this case, the circulating sequence of digits is given by 0, 9, 8, 7, 6, 5, 4, 3, 2, 1, and the check digit changes for example by 2 skips to 0, 8, 6, . . . in response to changes of the code numbers. The following Table 2 shows the singular points of the code numbers and the corresponding numbers of skips made.

TABLE 2

| Change of code number (singular point) | Change of check digit | No. of skips |
|---|---|---|
| ......4→...5 | 2→9 | 3 |
| ....099→...100 | 2→8 | 4 |
| ...0999→...1000 | 3→9 | 4 |
| . | . | . |
| . | . | . |
| . | . | . |
| . | . | . |

These facts have been investigated with all the possible weights for the modulus 10 check and the modulus 11 check, respectively, and it has been found that the circulating sequence of check digits for each combination of weights is determined by the numerical value of the least significant digit weight, that four different circulating sequences of digits hold for modulus 10 check as shown in Table 3 and that ten different circulating sequences of digits hold for the modulus 11 check as shown in Table 4.

TABLE 3

| | Modulus 10 check | | | | |
|---|---|---|---|---|---|
| | Least significant digit of code number changes by +1 | | Least significant digit of code number changes by −1 | | |
| Least significant digit Weight | Group symbol | Circulating digit group | Group symbol | Circulating digit group | pattern of change |
| 1 | A | 0987654321 | $\bar{A}$ | 0123456789 | 1-skip |
| 2 | A | 0987654321 | $\bar{A}$ | 0123456789 | 2-skip |

TABLE 3-continued

| Least significant digit Weight | Modulus 10 check: Least significant digit of code number changes by +1 | | Least significant digit of code number changes by −1 | | pattern of change |
|---|---|---|---|---|---|
| | Group symbol | Circulating digit group | Group symbol | Circulating digit group | |
| *2 | A | 0987654321 | $\bar{A}$ | 0123456789 | 2-skip |
| 3 | B | 0741852963 | B | 0369258147 | 1-skip |
| 4 | $\bar{B}$ | 0369258147 | $\bar{B}$ | 0741852963 | 2-skip |
| 6 | B | 0741852963 | $\bar{B}$ | 0369258147 | 2-skip |
| 7 | $\bar{B}$ | 0369258147 | B | 0741852963 | 1-skip |
| 8 | $\bar{A}$ | 0123456789 | A | 0987654321 | 2-skip |
| 9 | $\bar{A}$ | 0123456789 | A | 0987654321 | 1-skip |

In Table 3, the least significant digit weight *2 represents the Luhn's check, "+1" indicates a case in which the code number increases gradually in response to each printing operation and "−1" indicates another case in which the code number gradually decreases in response to each printing operation. The absence of a weight 5 is due to the fact that a situation frequently occurs in which the check digit repeatedly becomes 0, 5, for example, thus producing a detrimental effect on the error checking, and consequently the weight 5 is not used.

TABLE 4

| Least significant digit Weight | Modulus 11 check: Least significant digit of code number changes by "+1" | | Least significant digit of code number changes by "−1" | |
|---|---|---|---|---|
| | Group symbol | Circulating digit group | Group symbol | Circulating digit group |
| 1 | C | 0x987654321 | $\bar{C}$ | 0123456789x |
| 2 | D | 097531x8642 | $\bar{D}$ | 02468x13579 |
| 3 | E | 0852x741963 | $\bar{E}$ | 0369147x258 |
| 4 | F | 073x6295184 | $\bar{F}$ | 04815926x37 |
| 5 | G | 0617283945x | $\bar{G}$ | 05x49382716 |
| 6 | $\bar{G}$ | 05x49382716 | G | 061728394x5 |
| 7 | $\bar{F}$ | 04815926x37 | F | 073x6295184 |
| 8 | $\bar{E}$ | 0369147x258 | E | 0852x741963 |
| 9 | $\bar{D}$ | 02468x13579 | D | 097531x8642 |

All the circulating digit groups shown in Table 4 change by 1-skip, and "x" indicates a check digit 10.

As a result, with a numbering machine capable of printing check digits, by preparing check digit type wheels having the circulating digit groups which are shown in Tables 3 and 4 and by selecting one of the check digit type wheels according to the modulus and the numerical value of the least significant digit weight, it is possible to print each code number and its associated check digit for every combination of weights used with the modulus 10 check and the modulus 11 check, respectively.

Referring to FIG. 1, there is illustrated a schematic diagram showing the construction of a numbering machine designated to use any check digit type wheels having the circulating sequences of digits for the modulus 10 check shown in Table 3 and the circulating sequences of digits for the modulus 11 check shown Table 4 which have a one by one or 1-skip change pattern.

In the Figure, a print unit 10 for printing code numbers is rotatably mounted on a shaft 14 supported by a movable frame 12. The print unit 10 is shown in greater detail in FIG. 2 and it includes six numbering type wheels 16 which are independently rotatably mounted on the shaft 14. Each of the numbering type wheels 16 has digits 0 to 9 formed and arranged at equal spaces on its outer periphery, and the rotational pitch angle between the digits is 36°. Each of the numbering type wheels 16 is integrally provided on one side with a keyed gear 18 having ten teeth, and a change from one code number to the next code number is effected by rotating the gear 18 one pitch. Referring again to FIG. 1, a known type of print repeat frequency setting device 20 is mounted on the shaft 14 adjacent to the right side of the print unit 10.

A feed pawl unit 22 which is adapted to intermittently rotate the numbering type wheels 16 of the print unit 10, is fixedly mounted on a horizontal rod 24 which is arranged parallel to the shaft 14. The horizontal rod 24 is supported by a pair of pole arms 26 projected from the ends of the shaft 14. The shaft 14 is rotatably extended through the pole arms 26. A horizontal rod 28 is supported by the pole arms 26 in the back of the horizontal rod 24. As a result, when during printing operation the movable frame 12 is lowered thus pressing the print unit 10 against a work sheet and printing a code number on the sheet and the frame 12 is then raised into the original position, the pole arms 26 are rocked about a fixed axis 30. This means that in response to each printing the pole arms 26 are relatively rocked and rotated about the shaft 14.

Figure 2:
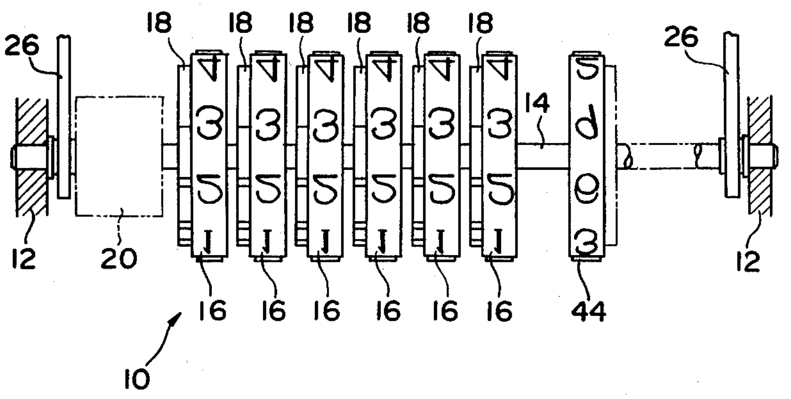
FIG. 2 is a schematic diagram of the print unit used in the embodiment of FIG. 1.

The feed pawl unit 22 is mounted on the horizontal rod 24 at a position corresponding to the print unit 10. The feed pawl unit 22 includes a repeat frequency setting pawl 32 and six pawls 34, 36, 38, 40, 42 and 43 which are different in length from one another. The pawls 34, 36, 38, 40, 42 and 43 are associated with the gears 18 shown in FIG. 2, and the pawl 34 is always engaged with the gear 18 of the left end numbering type wheel 16 (i.e., the right end type wheel in FIG. 2) for printing the least significant digit of each code number. The other pawls 36, 38, 40, 42 and 43 are selectively engaged with the associated gears 18 to change the digit on the next higher place numbering type wheel to the next digit when a carry is generated from the next lower place numbering type wheel. As a result, each of the gears 18 shown in FIG. 2 is formed with a known type of carry-over deep groove (not shown). For example, when the pawl 34 falls in the deep groove of the associated gear 18, the pawl 36 engages with the associated gear 18 and consequently the two numbering type wheels 16 corresponding to the pawls 34 and 36 are rotated simultaneously one pitch thus forwarding a carry to the next higher code number digit place. It is arranged so that when forwarding a carry, the higher the digit place to which the carry is forwarded, the greater will be the rotational angle of the feed pawl unit 22. The angle of rotation of the horizontal rod 24 caused by the feed pawl unit 22 during the forwarding of a carry plays an important role in detecting a singular point of code number and controlling the idling of the check digit type wheel. Disposed next to the print unit 10 is the check digit type wheel 44 including a ratchet wheel 46 having 10 teeth and made integral with the type wheel 44, and the type wheel 44 is rotatable independently of the print unit 10. The check digit type wheel 44 is provided on its outer periphery with a circulating sequence of digits (10 pitches) corresponding to one of the 1-skip change pattern digit groups in Table 3 or one of the circulating sequences of digits (11 pitches) in Table 4, and these digits are arranged at equal spaces. The check digit type wheel 44 is intermittently rotated in synchronism with the least significant digit numbering type wheel 16 in response to a change from one code number to the next number except at a singular point or change which generates a carry (with the Luhn's check, however, singular points will be caused in addition to those changes which generate carries). This synchronized feeding is effected by a mechanism comprising a feed pole 48 having a pawl portion 50 engaged with the ratchet wheel 46, a spring 54 for transmitting the rocking force of the feed pawl unit 22 to the feed pawl 48 and a pawl stopper 54 vertically fitted in the side of the feed pawl unit 22.

The feed pole 48 is rotatably mounted at its central portion on the horizontal rod 24, and a tension spring 54 is extended between the feed pole 48 on the pawl portion 50 side and a pole stopper 52. Consequently, when the feed pawl unit 22 is rotated a predetermined angle with respect to the pole arms 26 in a direction opposite to an arrow D, the feed pole 48 is pulled by the tension spring 54 and the pawl portion 50 is pressed against the ratchet wheel 46. As a result, the feed pole 48 and the feed pawl unit 22 are rotated as a unit and the check digit type wheel 44 is intermittently rotated, along with the ratchet wheel 46, practically in synchronism with the least significant digit numbering type wheel 16 of the print unit 10.

Next, a mechanism for idly rotating the check digit type wheel 44 a predetermined number of skips in response to the occurrence of a code number singular point or a carry from one code number digit place to the next higher digit place will be described.

Firstly, in order that the check digit type wheel 44 may be caused to idle, the feed pole 48 must be brought out of engagement with the ratchet wheel 46. The required mechanism for disengaging the feed pole 48 comprises a pinion 58 fixedly mounted on the horizontal rod 24, a pinion 60 rotatably mounted on the horizontal rod 28 to engage with the pinion 58 and a control pin 62 projected from the side of the pinion 60. In response to the occurrence of a carry, the amount of rotary motion of the feed pawl unit 22 is increased in the direction opposite to the arrow D so that the amount of rotation of the pinion 60 engaging the pinion 58 is also increased and the rear end portion of the feed pole 48 is forced upward by the control pin 62, thus bringing the pawl portion 50 of the feed pole 48 out of engagement with the ratchet wheel 46 and thereby preventing the feeding of the check digit type wheel 44 in synchronism with the print unit 10.

Also a driving source is necessary for idly rotating the check digit type wheel 44 and a rotational angle control mechanism must also be provided so that the check digit type wheel 44 is idly rotated from the driving source a predetermined number of skips corresponding to a code number singular point.

The driving source comprises a torsion spring 66 connected to the left end of a drive shaft 64 coupled to the check digit type wheel 44. One end of the torsion spring 66 is connected to a flange 68 disposed to the left of the drive shaft 64 and the other end of the torsion spring 66 is connected to a cam wheel 70 including a cam portion 78. The cam wheel 70 is connected to a ratchet wheel 74 which operates as a torque limiter through a torque setting spring 72. A stopper pin 76 is fitted in the ratchet wheel 74 on the side of the cam wheel 70, so that when the stopper pin 76 abuts the cam portion 78, the ratchet wheel 74 is locked by the cam wheel 70. A pawl 80 is in mesh with the ratchet wheel 74, and the pawl 80 is fitted to the peripheral edge of a gear 82 so as to engage with the ratchet wheel 74 against the drive force of the torsion spring 66. The ratchet wheel 74, the cam wheel 70 and the gear 82 are all rotatably mounted on the shaft 14. The gear 82 is connected to a gear shaft 88 through idle gears 84 and 86, and a drive gear 90 is fixedly mounted on the gear shaft 88 on which the idle gear 86 is fixedly mounted. As a result, the driving force stored in the torsion spring 66 is transmitted to the drive gear 90 by way of the gear 82, the idle gears 84 and 86 and the gear shaft 88.

When the check digit type wheel 44 is rotated intermittently by the feed pole 48, the torsion spring 66 is intermittently pressed to store a predetermined driving energy. When the torsion spring 66 is pressed excessively, the cam wheel 70 rotates along with the torsion spring 66 in the same direction against the torque setting spring 72 and the cam portion 78 brings the pawl 80 out of engagement with the ratchet wheel 74. When this occurs, the ratchet wheel 74 is rotated by the reaction force of the torque setting spring 72 and the stopper pin 76 of the ratchet wheel 74 is stopped at a position where the stopper pin 76 is projected into contact with the cam portion 78 of the cam 70. The releasing of the ratchet wheel 74 releases to the outside the excessive energy stored in the torsion spring 66.

Disposed between the driving source constructed as described above and the check digit type wheel 44 is a rotational angle control mechanism whereby the rotational output angle of the driving source is controlled to idly rotate the check digit type wheel 44 in accordance with the value of the rotational angle of the feed pawl unit 22. The rotational angle control mechanism comprises an actuation control section for determining the time of actuation of the driving source including the torsion spring 66 and transmitting the driving force to the check digit type wheel 44 and a rotational angle control section for determining the magnitude of the rotational angle after the actuation.

The rotational angle control section of the rotational angle control mechanism comprises a preset cam group 92 rotatably mounted on the drive shaft 64, a plurality of levers 94 selectively in contact with the outer surface of the preset cam groups 92, a plurality of disk selection cams 96 fixedly mounted on the horizontal rod 24 to be respectively associated with the levers 94, a driven gear 98 fixedly attached to the preset cam group 92 to engage with the drive gear 90, and a ratchet stopper 100 including a ratchet wheel 102 fixedly mounted on the drive shaft 64 to rotate the drive shaft 64 along with the preset cam group 92 rotated from the driving source and a stopper pawl 104 connected to the preset cam group 92.

Figure 3:
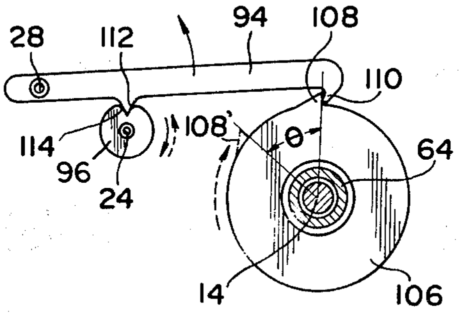
FIG. 3 is a schematic diagram useful for explaining the relationship between the preset cam and the pawl lever used in the embodiment of FIG. 1 for storing the number of skipping check digits.

The print unit 10 has six singular points and consequently the preset cam group 92 comprises six preset cams 106. FIG. 3 shows the preset cam group 92 in greater detail. In the Figure showing one set of the lever 94, the selector cam 96 and the preset cam 106, the prese cam 106 includes a pawl tooth 108 and consequently an initial set position indicated at 108' to provide a rotational angle $\theta$ required for the tooth 108 to engage with a pawl 110 of the lever 94 can be preset as desired. The set rotational angle $\theta$ determined by the preset cam 106 represents the idle rotational angle of the check digit type wheel 44 at one of the code number singular points. The lever 94 which determines the stop position of the preset cam 106, is provided on its central portion with a downwardly projected guide pawl 112 and the rear end of the lever 94 is rotatably mounted on the horizontal rod 28, thus forcing the guide pawl 112 into contact with the outer periphery of the selector cam 96. The selector cam 96 is provided in the outer periphery with a V-shaped groove 114 adapted to receive the guide pawl 112 of the lever 94, so that when the corresponding numbering type wheel of the print unit 10 is changed to generate a carry, the selector cam 96 is rotated to the illustrated position and the guide pawl 112 of the lever 94 is received in the groove 114. Consequently, the lever 94 is lowered thus bringing its pawl 110 into contact with the outer periphery of the preset cam 106 and the rotation of the preset cam 106 is stopped when it rotates through the angle $\theta$ by the operation of the actuation control section which will be described later. In this case, the drive shaft 64 is rotated along with the preset cam 106 and consequently the check digit type wheel 44 fixedly mounted on the drive shaft 64 is idly rotated through the rotational angle $\theta$ in response to the occurrence of the code number singular point. The setting of the rotational angle $\theta$ of the preset cam 106 is suitably selected in accordance with the number of skips for the circulating check digit group, which is required when forwarding a carry from one code number digit place to another. The initial position of the V-shaped groove 114 in the selector cam 96 is also suitably preset in accordance with the rotational angle of the feed pawl unit 22 required for forwarding a carry.

Referring again to FIG. 1, the turning force by the driven gear 98 imparts a force in the same direction as the direction of rotation of the check digit type wheel 44 so as to cause the preset cam group 92 to follow the rotation of the ratchet wheel 46 more rapidly and the turning force also releases the torque of the torsion spring 66.

On the other hand, the actuation control section of the rotational angle control mechanism comprises stopper means including a pawl 118 mounted on the same shaft supporting the stopper pawl 104 and a stopper 120, a detent pawl 56 for preventing backward movement of the ratchet wheel 46 which is integral with the check digit type wheel 44, a trip cam wheel 122 having a pair of cams 124 and 125 for respectively releasing the engagement of the detent pawl 56 and the pawl 118 and a disengaging cam device 123 for rotating the cam wheel 122.

The pawl 118 which is engaged with the stopper 120 fixed to the frame, is rotatably mounted on the shaft on which the stopper pawl 104 is mounted. As a result, unless the engagement between the stopper 120 and the pawl 118 and the engagement between the ratchet wheel 46 and the detent pawl 56 are released, the preset cam group 92 will not be rotated from the driving source. The trip cam wheel 122 having the cams 124 and 125 which are integral therewith, is rotated when the feed pawl unit 22 is rotated in response to the occurrence of a code number singular point, and the rotation releases the engagement of the pawl 118 and the detent pawl 56. This rotation of the trip cam wheel 122 is effected by a lever 126 fitted to the cam wheel 122. Consequently, the disengaging cam device 123 comprises a disk cam 128 fixedly mounted on the horizontal rod 24 and having a projection on one side, a driving lever 130 fixedly mounted on the horizontal rod 28 and adapted to be traversely pushed by the side projection of the disk cam 128 into engagement with the rear end of the lever 126, and a return spring 132 for returning the lever 126 into the original position. A slide pin 134 provided on the driving lever 130 brings the driving lever 130 and the side of the disk cam 128 into sliding contact with each other. The disengaging cam device 123 is controlled by the rotation of the feed pawl unit 22 caused when forwarding a carry from one code number digit place. When the feed pawl unit 22 is rotated, the disk cam 128 is rotated and consequently the driving lever 130 is pushed to the left by way of the slide pin 134 into engagement with the lever 126. Then, by virtue of the rotation of the horizontal rod 28 relative to the shaft 14, the trip cam wheel 122 is rotated through the driving lever 130 and the lever 126. The rotation of the trip cam wheel 122 raises the pawl 118 and the detent pawl 56 by the cams 124 and 125, and the engagement between the stopper 120 and the pawl 118 and that between the ratchet wheel 46 and the check pawl 56 are released. Consequently, when the drive shaft 64 is rotated by the torque transmitted to the flange 68, the ratchet wheel 102 made integral with the drive shaft 64 is rotated and the check digit type wheel 44 is rotated. Since the ratchet wheel 102 is always in mesh with the pawl 104, the rotation of the ratchet wheel 102 is transmitted to the stopper pawl 104 and to the preset cam group 92 through the shaft. Simultaneously, by virtue of the turning force applied by the drive gear in the same direction, the driven gear 98, the preset cam group 92, the stopper pawl 104 and the pawl 118 are also rotated to facilitate the rotation of the drive shaft 64 and the check digit type wheel 44 and consequently the check digit type wheel 44 is idly rotated a predetermined number of check digit skips.

The overall operation of the machine shown in FIG. 1 will now be described with reference to the case of the modulus 10, weights 1, 3, 7, 1, 3, 7 check. In this case, since the least significant digit weight is 7, a check digit type wheel formed with the circulating sequence of digits "0369258147" shown by the group symbol B in Table 3 is used. With this weights 1, 3, 7, 1, 3, 7 check, the number of skipping check digits at the respective code number singular points become as shown in the following Table 5.

TABLE 5

Modulus 10, Weights 1, 3, 7, 1, 3, 7 check

| Code number singular point | No. of check digit skips |
|---|---|
| .......9→.......10 | 0 |
| ......99→......100 | 3 |
| .....999→.....1000 | 4 |
| ....9999→....10000 | 3 |
| ...99999→...100000 | 6 |

Figure 4A:
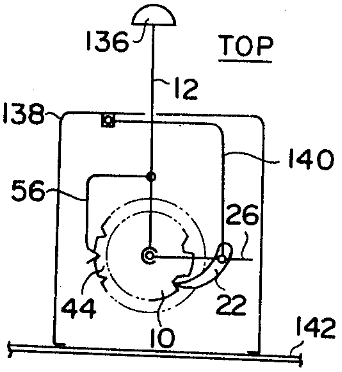
FIGS. 4A to 4F are diagrams showing 5 different stages of the continuous operating steps of the print unit during its printing operation.
Figure 4D:
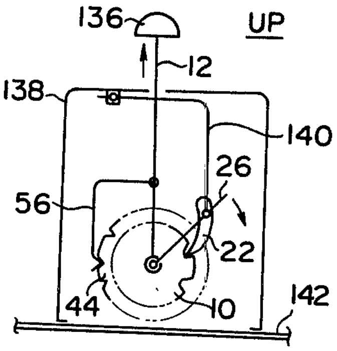
Figure 4B:
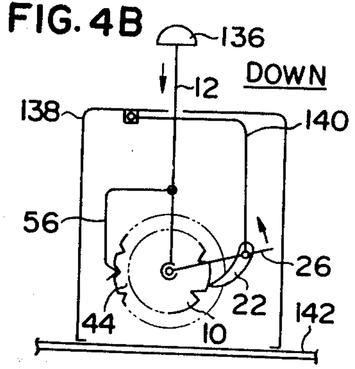
Figure 4E:
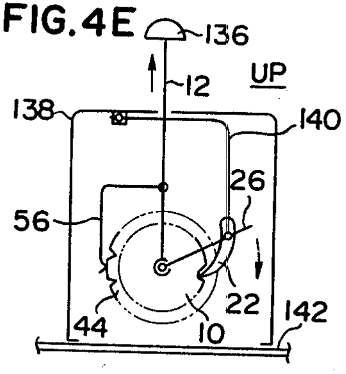
Figure 4C:
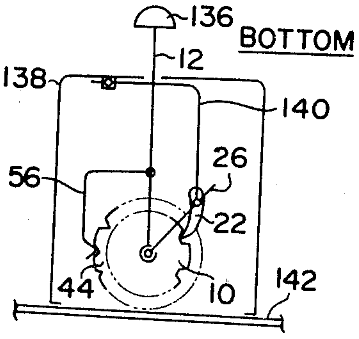

Then, the rotational angles of the check digit type wheel 44 corresponding to the numbers of skipping digits shown in Table 5 are preset in the preset cams 106 of the preset cam group 92. In the initial condition, the code number of the print unit 10 and the digit of the check digit type wheel 44 are both set to zero. Upon completion of this initial setting operation, the printing operation is started. One cycle of the printing operation is analyzed and shown schematically in FIGS. 4A to 4F. As shown in FIG. 4A, the mechanism shown in FIG. 1 is housed in a frame 138, and it is placed in a fixed relation with the frame 138 by a link 140. The movable frame 12 which is extended upward is provided with a knob 136 at its upper end, and the printing operation is started by depressing the knob 136. When the knob 136 is depressed, as shown in FIG. 4B, the print unit 10 is moved downward and the pole arms 26 are rotated upward. In this case, the feed pawl unit 22 is brought out of engagement with the groove of the print unit 10. When the movable frame 12 is lowered further, as shown in FIG. 4C, the print unit 10 contacts and prints a code number and a check digit on a paper surface 142. In this case, the feed pawl unit 22 has fallen into the next groove of the print unit 10. Then, as the knob 136 is released, as shown in FIG. 4D, the print unit 10 is raised by the force of the spring and the feed pawl unit 22 is engaged with the groove of the print unit 10. When the movable frame 12 is moved upward, as shown in FIG. 4E, the pole arms 26 are rotated downwardly and the print unit 10 and the check digit type wheel 44 are rotated. Eventually at the position shown in FIG. 4F, the print unit 10 and the check digit type wheel 44 are each fed one pitch.

Figure 4F:
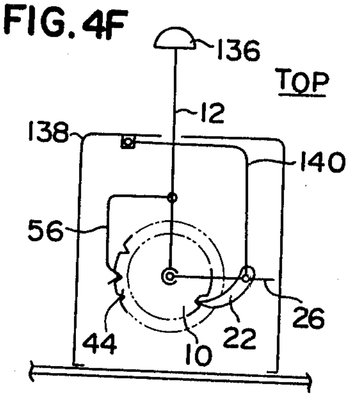

While the operation represents the case in which the check digit type wheel 44 is fed in synchronism with the print unit 10, when a carry is generated from one code number digit place or at a code number singular point, in FIG. 4C the feed pawl unit 22 falls into the groove of the print unit 10 having a greater depth, so that the rotational angle of the feed pawl unit 22 relative to the pole arms 26 is increased and consequently the check digit type wheel 44 is idly rotated by the mechanism of FIG. 1 through the steps of FIGS. 4D to 4F.

The operation of the mechanism of FIG. 1 for effecting the above-mentioned printing operation will now be described. Firstly, when there is no carry from any code number digit place, the operation is as follows. The lever 48 is rocked in synchronism with the movement of the feed pawl 34 which intermittently feeds the least significant numbering type wheel 16 (left end) of the print unit 10, and the ratchet wheel 46 is fed pitch by pitch thus intermittently feeding the check digit type wheel 44. The intermittent rotation of the check digit type wheel 44 is transmitted to the torsion spring 66 through the drive shaft 64, and thus the torsion spring 66 is intermittently pressed so as to store the driving energy required for idly rotating the check digit type wheel 44 at each code number singular point. When changing from the code number 000009 to 000010, the units and tens numbering type wheels 16 are rotated simultaneously, so that the pawl 34 of the feed pawl unit 22 falls into the deep groove of the units numbering type wheel 16 and the rotational angle of the feed pawl unit 22 is increased. This results in a synchronization releasing operation in which the pinion 58 rotates the pinion 60 to force the rear end of the lever 62 upward and the pawl portion 50 of the lever 48 is disengaged with the ratchet wheel 46. Simultaneously, the central projection of the lever 94 (left end) corresponding to the units numbering type wheel 16 and adapted to select the preset cam group 92, is engaged with the selector cam 96 and the forward end pawl of the lever 94 is contacted with the outer periphery of the preset cam 106 preset to the number of skipping digits of 0 in Table 5, thus completing the preparation for rotational angle control. As the feed pawl unit 22 is rotated further, the driving wheel 60 mounted on the horizontal rod 28 is brought into engagement with the lever 126 by the cam disk 128 and the initial conditions for disengaging the pawl 118 and the detent pawl 56 are completed. This preparatory operations are completed through the steps of FIGS. 4A to 4C for printing the code number 000009.

After the code number 000009 has been printed, the following operation takes place during the steps of FIGS. 4D to 4F. Due to the rotation of the horizontal rod 28 relative to the shaft 14 after the printing, the trip cam wheel 122 is rotated through the driving lever 130 and the lever 126 which are fixedly mounted on the horizontal rod 28, and consequently the cams 124 and 125 of the cam wheel 122 respectively disengage the detent pawl 56 from the ratchet wheel 46 and the pawl 118 from the stopper 120. Immediately after the detent pawl 56 and the pawl 118 have been disengaged, the rotation is transmitted to the flange 68, the drive shaft 64 and the check digit type wheel 44 and also to the ratchet wheel 102, the stopper pawl 104 and the preset cam group 92, and on the other hand the driving force applied from the torsion spring 66 to the driven gear 98 of the preset cam group 92 through the drive gear 90 acts in a manner to facilitate the rotation further.

However, since the number of skipping check digit is zero when changing from the code number 000009 to 000010, the rotational angle preset into the preset cam group 92 is zero. As a result, the check digit type wheel 44 is not rotated and at the step of FIG. 4F the entire mechanism is returned to the initial condition or the condition in which the check digit type wheel 44 is fed synchronously. Each time a carry is generated from the units digit place such as when changing from the code number 000019 to 000020, from 000029 to 000030, etc., the same control is effected to stop the rotation of the check digit type wheel 44.

Next, at a singular point where there is a change from the code number 000099 to 000100 or a change from the number of two figures to three figures, as will be seen from Table 5, the number of skipping check digits is 3, that is, the preset cam 106 of the preset cam group 92 corresponding to the tens numbering type wheel 16 has a preset rotational angle of 108° corresponding to the number of 3. Consequently, when the detent pawl 56 and the pawl 118 are disengaged by the trip cam wheel 122 after the printing of the code number 000099, the rotating force is transmitted to the check digit type wheel 44 through the torsion spring 66, the flange 68 and the drive shaft 64 and also to the preset cam group 92 through the drive shaft 64, the ratchet wheel 102 and the stopper pawl 104, while on the other hand the rotating force is transmitted from the torsion spring 66 to the driven gear 98 through the pawl 80, the gears 82, 84 and 88 and the driving gear 90, and consequently the check digit type wheel 44 is rotated 108° corresponding to the 3-skip change pattern of the circulating sequence of digits for check digits until the pawl of one of the layers 94 is brought into contact with one of the preset cams of the preset cam group 92, e.g., the second preset cam from the right. Thereafter, when the lever 126 is disengaged with the driving lever 130 by a cam which is not shown so that the cam wheel 122 is returned to the initial position by the spring 132, the detent pawl 56 is engaged with the ratchet wheel 46. Thereafter, the engagement between the lever 94 and the preset cam group 92 is released by a cam which is not shown and the rotating force of the driving gear 90 is transmitted to the driven gear 98, thus rotating the pawl 118 until it engages with the stopper 120 as shown in the Figure and thereby initializing the conditions as shown in the Figure. Of course, the ratchet wheel 102 is engaged with the stopper pawl 104. In this way, when the next code number 000100 is printed, the check digit corresponding to a 3-skip change from the check digit of the code number 000099 is printed. At any other singular point, the check digit type wheel 44 is similarly rotated idly in accordance with the corresponding number of check digit skips shown in Table 5.

While the above described operation relates to the case of the modulus 10, weights 1, 3, 7, 1, 3, 7 check, as regards the modulus 10 check with other weights as well as the modulus 11 check, by selecting the suitable check digit type wheel according to the weights used and determining the number of skips to be made at the respective singular points in accordance with the weights, it is possible to use the mechanism shown in FIG. 1 in cases where the pattern of change of the circulating sequence of digits is 1-skip with change of code number. With the modulus 11 check, the number of digits in the circulating sequence of digits for check digits is 11 and therefore the mechanism shown in FIG. 1 can be used as such except that the number of teeth on the ratchet wheel 46 integral with the check digit type wheel 44 must be 11 instead of 10.

Figure 5:
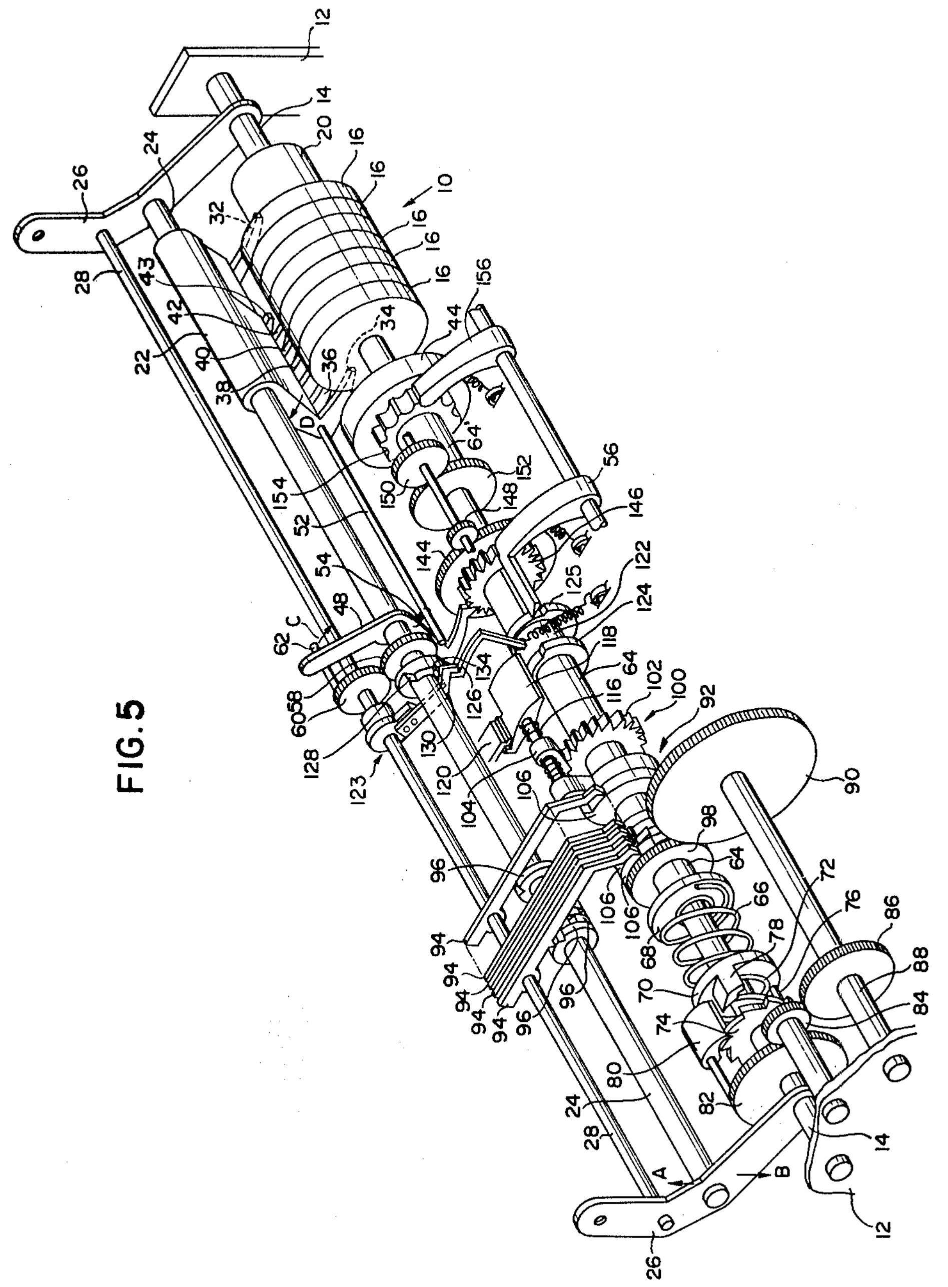
FIG. 5 is a schematic diagram of another embodiment of the invention showing the construction for intermittently rotating the check digit type wheel at a pitch two times that of the least significant digit numbering type wheel of the print unit.

FIG. 5 shows a mechanism according to another embodiment of the invention which is designed for printing check digits in those cases of Table 3 in which the change pattern of the circulating sequence of digits is the 2-skip pattern. For example, in Table 3 the circulating sequence of digits corresponding to the case where the least significant digit weight is 2 and the change of code number is "+1" is 0987654321, and the change pattern of check digits with change of code number is the 2-skip pattern, that is, the check digits change with the 2-skip pattern to 0, 8, 6, 4, 2 and so on. As a result, a double rotational angle synchronizing unit is necessary to intermittently feed the check digit type wheel in synchronism with a rotational angle which is two times that of the least significant digit numbering type wheel. This double rotational angle synchronizing unit must be used with those cases of Table 3 where the least significant digit weight is an even number, e.g., 2, 4, 6 or 8 and the case of the Luhn's check.

In FIG. 5, the double rotational angle synchronizing unit comprises a ratchet wheel 146 made integral with a gear 144, a train of gears 148, 150 and 152 for transmitting the rotation of the gear 144 to a split drive shaft 64', a holding gear 154 which is integral with the check digit type wheel 44 and fixedly mounted on the split drive shaft 64', and a holding pawl 156 fixedly mounted on the shaft carrying the detent pawl 56 engaged with the ratchet wheel 146 and engaged with the holding gear 154. The ratchet wheel 146 has 20 teeth with pitches two times the 10 pitches of the check digit type wheel 44, and every 1/10 revolution of the ratchet wheel 146 rotates the check digit type wheel 44 2/10 of a revolution through the gear train. The number of teeth on the ratchet wheel 102 which is engaged with the preset cam group 92 through the stopper pawl 104 is also selected 20 to suit the ratchet wheel 146.

The double angle synchronized feeding of the check digit type wheel 44 which is synchronized with the least significant digit numbering type wheel 16 of the print unit 10, is effected by intermittently feeding the ratchet wheel 146 pitch by pitch in response to the rocking motion of the lever 48 caused by the feed pawl unit 22 in the same manner as the embodiment shown in FIG. 1.

On the other hand, the idling rotation of the check digit type wheel 44 at each code number singular point or at the time of carry-over from one code number digit place, is effected by the same arrangement used with the embodiment of FIG. 1. In this case, however, the idling rotational angle $\theta$ of the check digit type wheel 44 preset into the preset cam group 92 is increased by two times by the double rotational angle synchronizing unit, and consequently the idling rotational angle preset into the preset cam group 92 must be selected to be $\frac{1}{2}$ of the rotational angle corresponding to the number of skips for the check digit type wheel 44.

On the other hand, with the Luhn's check or weights 1, 2, 1, 2, 1, 2 check, a singular point occurs when changing from 4 to 5 in the units digit position and no singular point occurs when changing from the number of single figure to two figures. Consequently, the arrangement of FIG. 5 cannot be used as such. With the Luhn's check, code number changes causing singular points and the corresponding numbers of skips are shown in the following Table 6.

TABLE 6

| | | Luhn's check | | | |
|---|---|---|---|---|---|
| Code number | Check digit | Code number | Check digit | Code number | Check digit |
| | | . | . | | |
| 0 | 0 | . | . | 999 | 3 |
| | | | | x | ④ |
| 1 | 8 | 99 | 2 | 1000 | 9 |
| | | x | ④ | | |
| 2 | 6 | 100 | 8 | . | . |
| | | . | . | . | . |
| 3 | 4 | . | . | . | . |
| | | . | . | | |
| 4 | 2 | . | . | 1999 | 2 |
| | ③ | | | x | ④ |
| 5 | 9 | 104 | 0 | 2000 | 8 |
| | | x | ③ | . | . |
| 6 | 7 | 105 | 7 | . | . |
| | | . | . | . | . |
| 7 | 5 | . | . | . | . |
| | | . | . | | |
| 8 | 3 | . | . | 2544 | 5 |
| | | | | x | ③ |
| 9 | 1 | 499 | 4 | 2545 | 2 |
| | | x | ⑤ | . | . |
| 10 | 9 | 500 | 9 | . | . |
| . | . | . | . | . | . |
| 14 | 1 | . | . | . | . |
| x | ③ | . | . | . | . |
| 15 | 8 | . | . | . | . |
| | | . | . | . | . |

In Table 6, each x indicates a singular point and each circled number indicates the number of check digit skips.

Figure 6:
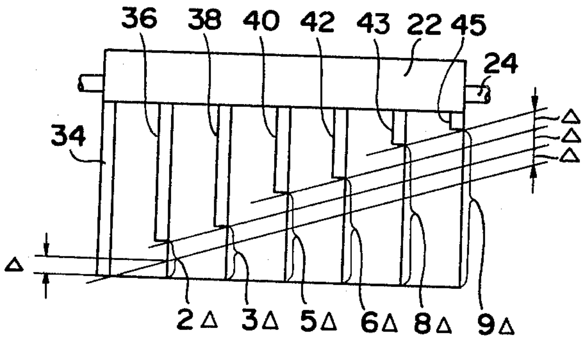
FIG. 6 is a schematic diagram showing the feed pawl unit used in the embodiment of FIG. 5.

To print the check digits according to the Luhn's check, the respective pawls of the feed pawl unit 22 of FIG. 5 have different lengths as shown in FIG. 6. In other words, the length of the pawl 34 for feeding the units numbering type wheel is greatest, the pawl 36 for feeding the next tens numbering type wheel is shorter than the pawl 34 by $2\Delta$ and the remaining pawls are shorter by $\Delta$ or $2\Delta$ than the next lower digit pawl. Thus, the pawl 45 for feeding the millions numbering type wheel is shorter than the pawl 34 by $9\Delta$. The print unit 10 which is intermittently rotated by the feed pawl unit 22 is provided with the known type of deep grooves for generating carries. In addition, the least significant digit or units numbering type wheel is provided, in addition to the groove of a depth Δ for advancing purposes, with a check digit type wheel idling deep groove having a depth slightly smaller than 2Δ and positioned to engage with the pawl 34 to effect a change from 4 to 5 in the code number. When changing from 4 to 5 in the code number, there is no possibility of causing a carry from the units digit place to the tens digit place due to the falling of the pawl 34 into the groove slightly smaller than the depth 2Δ, since the pawl 36 corresponding to the tens numbering type wheel is shorter than the pawl 34 by 2Δ.

The feed pawl unit 22 of FIG. 6 and the associated print unit 10 can be used with the embodiment of FIG. 5 to print the check digits according to the Luhn's check. Further, by using the feed pawl unit 22 of FIG. 6, the rotational angle control section is provided with a total of 9 sets, as many as the type wheels in the print wheel 10 plus one set, of the lever 94, the selector 96 and the preset cam 106. In other words, in addition to the sets for idly rotating the check digit type wheel 44 in response to the generation of carries in code numbers, another set is added for idly rotating the check digit type wheel 44 in response to a change from 4 to 5 in the code number corresponding to the weight of 2. Also as will be seen from Table 6, no singular point occurs in response to a carry from the unit digit place to the tens digit place of code number so that the number of check digit skips is 2 and the double angle synchronized feeding is effected in synchronism with the print unit 10. In this case, however, since the synchronized feeding lever 48 will be disengaged due to the increased rotatation of the feed pawl unit 22, if the set idle rotational angle of that preset cam of the preset cam group 92 which is selected in response to a carry from the units to the tens digit place, is preset so as to cause the check digit type wheel 44 to make a 2-skip rotation, even if the lever 48 is disengaged thus releasing the double rotational angle synchronized feeding, the check digit type wheel 44 will be intermittently fed in the 2-skip fashion.

Figure 7:
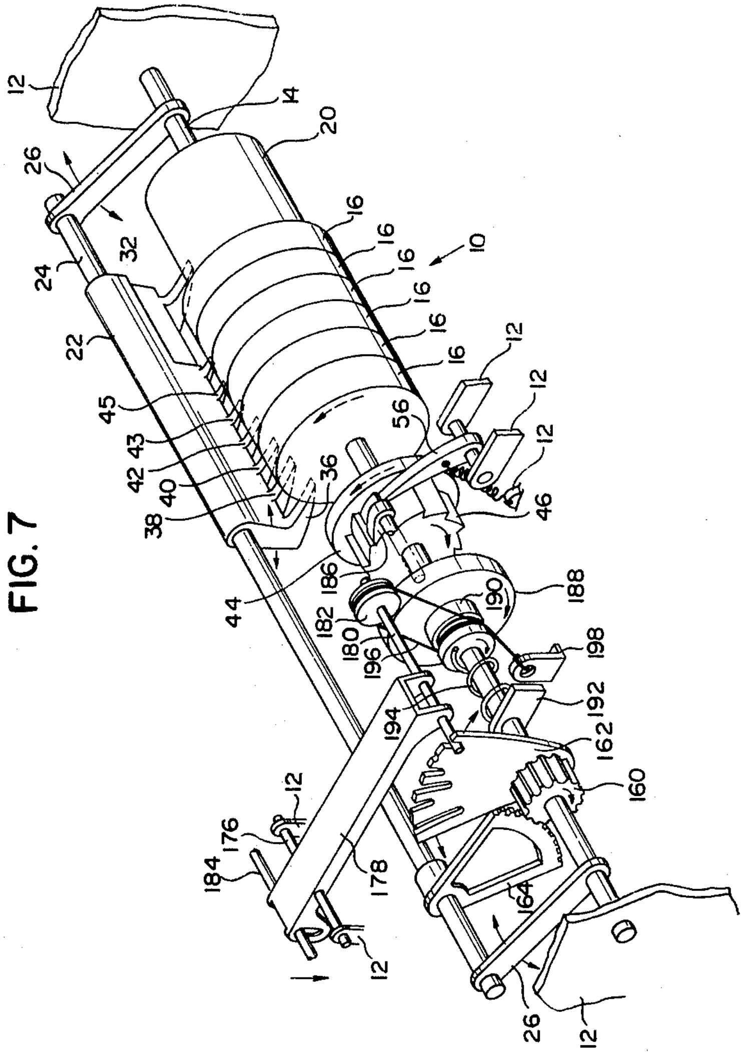
FIG. 7 is a schematic diagram showing the construction of still another embodiment of the invention.

Referring now to FIG. 7, there is illustrated a schematic diagram of still another embodiment of the mechanism according to the invention, which is identical with the embodiments of FIGS. 1 and 5 except the drive control section for idly rotating the check digit type wheel 44 a predetermined number of skips at each singular point of code number. The print unit 10 and the feed pawl unit 22 are similar to their counterparts in the embodiments of FIGS. 1 and 5 and therefore the like reference numerals are used to indicate the like component parts.

In the Figure, a sector encoding plate 162 which is integral with a pinion 160 is rotatably mounted on the shaft 14 to the left of the print unit 10. The pinion 160 is adapted for engagement with a sector gear 164 which is fixedly mounted on the horizontal rod 24 on which is mounted the feed pawl unit 22, and in this way the rotation of the feed pawl unit 22 upon printing operation is transmitted to the sector gear 164.

Figure 8:
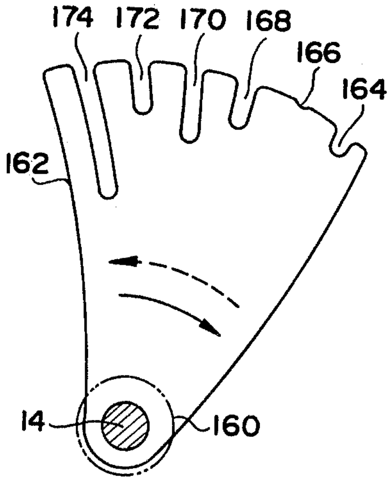
FIG. 8 is a schematic diagram showing the encoding plate used in the embodiment of FIG. 7.

As shown in FIG. 8, the encoding plate 162 is provided in its outer periphery with grooves 164, 166, 168, 170, 172 and 174 having different depths and arranged at predetermined spaces. The depths of the grooves are determined in accordance with the rotational angles of the check digit type wheel 44. In other words, the groove 164 is provided to intermittently rotate the check digit type wheel 44 in synchronism with the least significant digit or units numbering type wheel 16 of the print unit 10, and it has a depth which rotate the check digit type wheel 44 1/10 (36°) of a revolution. The other grooves are each provided to idly rotate the check digit type wheel 44 a predetermined number of check digit skips at a corresponding singular point, and FIG. 8 shows an example of the grooves having the depths corresponding to the numbers of check digit skips in the modulus 10, weights 1, 3, 7, 1, 3, 7 check in Table 5.

Referring again to FIG. 7, disposed between the encoding plate 162 and the check digit type wheel 44 are a drive unit for rotating the check digit type wheel 44 a predetermined angle and a feeler unit for controlling the drive unit.

Firstly, the feeler unit comprises a feeler arm 178 having a supporting shaft mounted on the movable frame 12, a feeler pin 180 mounted on the forward end of the feeler arm 178, and an idle pulley 182 rotatably mounted on the feeler pin 180. A control lever 184 is extended through a slot in the rear end of the feeler arm 178 to rock the same in such a manner that the feeler pin 180 is disengaged with the encoding plate 162 through the steps of FIGS. 4A to 4C and the feeler pin 180 is engaged with selected one of the grooves in the encoding plate 162 through the steps of FIGS. 4D to 4F.

The drive unit comprises a drive disk 188 having a drive pawl 186 fitted to the side thereof by a shaft so as to engage with the ratchet wheel 46 which is integral with the check digit type wheel 44, a wind-up pulley 190 which is integral with the drive disk 188, a torsion spring 194 having one end fixed to the wind-up pulley 190 and the other end fixed to a fixed member 192 and a wire 196. One end of the wire 196 is fixed to the wind-up pulley 190, and the other end of the wire 196 is fixed to a stopper 198 fixed to the movable frame 12 after winding the wire on the wind-up pulley 190 a plurality of times and on the idle pulley 182 half a turn. The torsion spring 194 is fitted to the wind-up pulley 190 in such a manner that the pulley 190 is biased to wind up the wire 196.

The printing operation of the embodiment of FIG. 7 will be described with reference to a case in which the check digit type wheel has the circulating sequence of digits according to the modulus 10 weights 1, 3, 7, 1, 3, 7 check and the encoding plate is provided with the plurality of grooves of depths corresponding to the numbers of skips shown in Table 5.

Firstly, the digits on the print unit 10 and the check digit type wheel 44 are set to the digit 0. Then, the printing operation is initiated so that by the steps shown in FIGS. 4A to 4C the movable frame 12 is moved downward and a code number with its associated check digit, i.e., 000000-0, is printed on a paper. In this case, the operating rod 184 operates the feeler arm 178 so as to cause the feeler pin 180 to slightly depart from the encoding plate 162 and the feed pawl unit 22 gets out of engagement with the feed grooves of the numbering type wheels 16, thus permitting the rotation of the feed pawl unit 22. Although the sector gear 164 also rotates slightly during this time interval, when the feed pawl unit 22 is engaged with the next feed grooves of the numbering type wheels 16 as shown in FIG. 4C, the sector gear 164 is returned to the initial position and the feeler pin 180 is engaged with the groove 164 of the encoding plate 162 shown in FIG. 8.

Then, the following operation is effected through the steps shown in FIGS. 4D to 4F. The units numbering type wheel 16 of the print unit 10 is rotated 1/10 of a revolution by the feed pawl unit 22 in response to the upward movement of the movable frame 12. Simultaneously, the rocking movement of the feeler arm 178 causes the feeler pin 180 to be pulled into the groove 164 of the encoding plate 162 (See FIG. 8) and consequently the space between the idle pulley 182 and the wind-up pulley 190 is decreased by an amount corresponding to the depth of the groove 164 of the encoding plate 162. As a result, the wire 196 is wound up by the wind-up pulley 190 through the torsion spring 194 and consequently the drive disk 188 is rotated 1/10 of a revolution or 36°. When this occurs, the drive pawl 186 fixed to the drive disk 188 is rotated 1/10 of a revolution and the ratchet wheel 46 is rotated one pitch, thus rotating the check digit type wheel 44 1/10 of a revolution. When the operation proceeds to the step of FIG. 4F, the feeler pin 180 is raised out of the groove 164 of the encoding plate 162, so that the wound wire 196 is unwound and the drive disk 188 is rotated 1/10 of a revolution in the reverse direction. In this case, since the ratchet wheel 46 is locked by the detent pawl 56, the drive pawl 186 rotates 1/10 of a revolution and thus it returns to the initial position to engage again with the ratchet wheel 46. As a result, the code number and check digit on the print unit 10 change to 000001-3 which is to be printed next. Where there is no carry producing change of code number, by the same operation as mentioned previously the check digits are sequentially changed in synchronism with the code number changes.

On the other hand, where the code number changes involve singular points the printing operation takes place as follows. The rotational angle of the feed pawl unit 22 for making a carry-over increases in such a manner that the higher the digit place, the greater is the rotational angle. The rotational angle is transmitted to the encoding plate 162 through the sector gear 164 so that the groove 166 is selected when changing the code number from a single figure to two figures, the groove 168 is selected when changing from the two figures to three figures, the groove 170 is selected when changing from the three figures to four figures, the groove 172 is selected when changing from the four figures to five figures and the groove 174 is selected when changing from the five figures to six figures By selecting a proper groove of the encoding plate 162 for the feeler pin 180, the amount of movement of the feeler pin 180 pulled into the groove is determined and the wire 196 is wound up by the same operation as mentioned previously. As a result, the drive disk 188 is rotated and the drive pawl 186 effects the singular point idling rotation of the check digit type wheel 44 which is integral with the ratchet wheel 46. In other words, the check digit type wheel 44 is rotated idly in accordance with the corresponding number of check digit skips shown in Table 5. The mechanism shown in FIG. 7 has a feature of being simpler in construction over that of FIG. 1.

While the embodiments of the invention described so far are primarily illustrative of manually operated numbering machines, the numbering machine of this invention can be incorporated as such in rotary presses so as to successively print code numbers with associated check digits.

Further, while the above-described embodiments relate to numbering machines employing mechanical mechanisms, it is possible to use a step motor as the driving source for idly rotating the check digit type wheel and it is also possible to electrically effect the downward movement of the movable frame so as to prevent fatigue of the operator due to the manual operation. Moreover, the mechanism of the invention can be used without any modification as a calculating machine for displaying the associated check digits for code numbers.

It will thus be seen that in accordance with the present invention, unlike the prior art mechanical mechanisms, it is possible to print successively any code numbers with associated check digits according to the modulus 10 check as well as the modulus 11 check, thus eliminating the trouble of calculating a check digit for each code number to be printed, making it possible to easily print code numbers with check digits having a very high degree of coding error detecting rate and very greatly increasing the efficiency of slip handling in the banking business.

What is claimed is:

1. A numbering machine in which each of code numbers to be printed and a check digit number associated therewith are printed simultaneously, said machine comprising:

a print unit including a plurality of numbering type wheels for successively setting the code numbers in response to print operations;

a check digit type wheel including a predetermined circulating sequence of digits for check digits corresponding to the code numbers to be printed by said print unit; and a check digit type wheel drive control means whereby in response to a change of the code number of said print unit by a print operation, the check digit printing digit on said check digit type wheel is changed according to a predetermined number of skips, said check digit type wheel drive control means including:

synchronous drive means for rotating said check digit type wheel in synchronism with the intermittent rotation of the numbering type wheel corresponding to the least significant digit place;

synchronous drive releasing means for disengaging said synchronous drive means with said check digit type wheel in response to a change of the code number on the numbering type wheels of said print unit dictating a skipping of said circulating sequence of digits for check digits;

a driving source for imparting a rotational driving force to said check digit type wheel in response to the disengagement of said synchronous drive releasing means; and rotational angle control means whereby said check digit type wheel is rotated by said driving source through a predetermined rotational angle corresponding to a predetermined number of skips of the circulating check digit pattern corresponding to a change of the code number.

2. A numbering machine according to claim 1, wherein each of said plurality of numbering type wheels is provided with a sequence of decimal digits corresponding to one of the digits in each said code number, and wherein said print unit includes feed pawl means responsive to the print operations of said numbering type wheels for intermittently rotating said type wheels to successively change the code numbers.

3. A numbering machine according to claim 1, wherein said predetermined circulating sequence of digits on said check digit type wheel is determined in accordance with a selected modulus and weights for calculating the check digit numerals associated with the code numbers.

4. A numbering machine according to claim 1, wherein said synchronous drive means comprises:

a ratchet gear integrally fitted to said check digit type wheel rotatably mounted on a shaft on which the type wheels of said print unit are mounted;

a lever fixedly mounted on a shaft on which the feed pawl means of said print unit is mounted, said lever being responsive to a rocking movement of said feed pawl means by print operation for intermittently rotating said ratchet gear in synchronism with the least significant digit numbering type wheel of said print unit; and spring means disposed to bias said lever in such a manner that said lever has its forward end engaged with said ratchet gear.

5. A numbering machine according to claim 4, wherein said synchronous drive releasing means comprises:

a first pinion fixedly mounted on the shaft supporting said lever engaged with said ratchet gear;

a second pinion rotatably mounted on another shaft parallel to said level supporting shaft in engagement with said first pinion; and a pin fitted to one side of said second pinion near the periphery thereof to oppose a rear end of said lever with a predetermined space therebetween, whereby in response to the rocking movement of said feed pawl means upon occurrence of a singular point by a change of code number, said first pinion is rotated to cause said pin fitted to said second pinion to force the rear end of said lever upward and thereby to disengage said lever with said ratchet gear.

6. A numbering machine according to claim 1, wherein said driving source includes a coiled spring disposed to be twisted by the intermittent rotation of said check digit type wheel caused by said synchronous drive means to store driving force.

7. A numbering machine according to claim 1, wherein said rotational angle control means comprises:

a plurality of preset cams each having a projection disposed to set an idle rotation stopping position of said check digit type wheel corresponding to a predetermined number of check digit skips of the circulating sequence of digits for check digits corresponding to a change from one code number to another in said print unit;

a plurality of selector levers each having at the forward end thereof a stopper pawl adapted to contact and bias the peripheral surface of corresponding one of said plurality of preset cams; and a plurality of selector cams whereby in response to a print operation bringing about a change from one code number to another in said print unit dictating a skipping of the circulating sequence of digits for check digits, selected one of said selector levers is brought into contact with the peripheral surface of associated one of said preset cams;

whereby when one of said selector cams corresponding to a change from one code number to another in said print unit causes the stopper pawl of associated one of said selector levers to contact the peripheral surface of said preset cam associated therewith, said check digit type wheel synchronous drive releasing means comes into operation to transmit the driving force of said driving source to said one preset cam and thereby to idly rotate said check digit type wheel until the stopper pawl of said associated lever engages with the projection of said associated preset cam.

8. A numbering machine according to claim 1, wherein said drive control means includes double rotational angle synchronizing means disposed to intermittently rotate said check digit type wheel a predetermined angle which is two times that of the least significant digit numbering type wheel of said print unit.

9. A numbering machine according to claim 1 wherein said rotational angle control means comprises an encoding plate having in its periphery a plurality of grooves each having a depth proportional to a predetermined number of check digit skips of said circulating sequence of digits for check digits corresponding to a change from one code number to another in said print unit;

a feeler pin responsive to a change from one code number to another in said print unit to select one of said plurality of grooves in said encoding plate;

an idle pulley mounted on said feeler pin whereby when said feeler pin engages with one of said grooves in said encoding plate, the extended length of a wire wound on a driving pulley made integral with said check digit type wheel is changed so as to rotate said check digit type wheel through an angle proportional to the depth of said one groove; and a feeler arm disposed to guide said feeler pin to selected one of said grooves in said encoding plate.

* * * * *